United States Patent Office

3,306,954
Patented Feb. 28, 1967

3,306,954
THERMOSETTABLE LIQUID RESIN SYSTEM
Eugene R. Moore, Midland, Mich., assignor to The Dow Chemical Company, Midland, Mich., a corporation of Delaware
No Drawing. Filed Jan. 21, 1964, Ser. No. 339,118
13 Claims. (Cl. 260—886)

This invention relates to a resin having good fluidity at room temperatures without the use of non-reactive solvents or diluents and which may be cured to a thermoset resin at elevated temperatures. More particularly, the invention concerns a solution of an interpolymer of a vinyl compound and an $\alpha,\beta$-unsaturated carboxylic acid dissolved in a reactive vinyl monomer. The solution also contains a polyfunctional compound as a cross-linking agent together with a quantity of an $\alpha,\beta$-unsaturated acid monomer, a free radical catalyst and a polymerization accelerator.

Thermoplastic resins such as styrene-maleic anhydride copolymers can be cross-linked with polyfunctional compounds to produce thermoset resins having properties which make them useful in laminates, coatings, etc. The thermoplastic copolymer is a solid at room temperature and must be processed and cured either at a temperature above its melting point or in the presence of a solvent. Processing at a temperature above the melting point frequently is not practical and the presence of a solvent may be undesirable in that the composition is not 100 percent reactive. The change in the volume when the solvent is removed may result in undesirable dimensional changes in the cured resin or the development of holidays in a coating.

According to this invention, I have produced a 100 percent reactive resin having good fluidity at room temperature and which is thermosettable. This resin is particularly useful in the preparation of laminates in that it can be processed at room temperature and cures without loss of solvent which produces a significant amount of shrinkage. This novel resin system comprises an interpolymer of a vinyl compound and an $\alpha,\beta$-unsaturated carboxylic acid dissolved in a reactive vinyl monomer. The solution also contains a small quantity of an $\alpha,\beta$-unsaturated acid monomer, a polyfunctional compound as a cross-linking agent, and a free radical type of polymerization catalyst which are added to the interpolymer solution shortly before the resin is to be used.

The interpolymer used in the preparation of these resins usually has a high ratio of vinyl monomer to the unsaturated carboxylic acid. The polymer may contain from 2 to 25 mole percent acid, however the preferred polymer contains about 5-20 mole percent of the unsaturated acid in the molecule. Interpolymers having this ratio of monomers in the molecule may be produced in a cyclic polymerization process such as that described by Hanson et al. in Industrial and Engineering Chemistry 49, 1803 (1957) whereas conventional bulk polymerization favors polymers having a 50-50 molar composition. Interpolymers containing more than about 25 percent of the unsaturated acid usually are not sufficiently soluble in vinyl monomers having a boiling point above the temperatures commonly used to cure these resins. The molecular weight of these interpolymers preferably is such that the viscosity of a 10 percent solution in methyl ethyl ketone measured at 25° C. is no greater than about 10 centipoise. The best workability of the resins is obtained when their solution viscosity is below about 4 centipoise.

Vinyl monomers which may be used in preparing these interpolymers as well as the reactive solvent for them include styrene, acrylonitrile, vinyl acetate, vinyl chloride, the esters of acrylic acid and an aliphatic alcohol containing from 1 to 8 carbon atoms, the esters of methacrylic acid and an aliphatic alcohol containing from 1 to 4 carbon atoms, ethylene, propylene, butadiene and isoprene. The low boiling vinyl compounds obviously are not suitable solvents for resin systems to be used at room temperature or elevated temperature however they may be used in preparing the interpolymers, then a higher boiling vinyl monomer used as a solvent. Divinyl compounds such as ethylene dimethacrylate may be used both as a solvent for the interpolymer and to accelerate the rate of cure. The solvent may be a mixture of two or more of these vinyl monomers.

The $\alpha,\beta$-unsaturated acid used in these resins may be either a monocarboxylic or a dicarboxylic acid as well as a cyclic anhydride of a dicarboxylic acid. Suitable acids include maleic, fumaric, chloromaleic, itaconic, citraconic, mesaconic, aconitic, acrylic and methacrylic as well as the cyclic anhydrides of those acids capable of producing them. Half esters of the unsaturated dicarboxylic acids also may be used. The cyclic anhydrides promote faster cure rates when polyol curing agents are used, and promote a more stable bond when polyamines are used.

The copolymer may be cross-linked with a polyfunctional compound which is reactive with the carboxyl groups in the polymer chain. Reactive compounds include the polyols, polyepoxides and polyamines. Suitable polyols are ethylene glycol, propylene glycol, polyethylene glycol, polypropylene glycol, glycerol, 1,4-butane diol and the like, as well as halogenated polyols such as tetrachlorobutane diol.

Polyols containing aromatic nuclei which have been found to be particularly suitable cross-linking agents are those having the hydroxyl groups attached to aliphatic chains such as the polyhydric polyethers of tetrabromo bisphenol A, bisphenol A, and the like. Polyepoxides which may be used include 2,2-bis(2,3-epoxypropoxyphenyl)propane, commonly known as the diglycidyl ether of bisphenol A, di-2,3-epoxypropyl ether, the epoxidized novolacs, as well as the alkylene oxide adducts of novolacs, and the like. Additionally, the polymeric polyols such as the copolymer of styrene and allyl alcohol are particularly effective cross-linking agents owing to their high functionality and high degree of solubility in reactive vinyl monomers.

Amine curing agents capable of cross-linking the interpolymer may be either primary or secondary aliphatic, aryl or heterocyclic amines such as diethylenetriamine, triethylenetetramine, methylenedianiline, m-phenylenediamine, piperazine, etc.

The polymerization of the interpolymer with the monomeric vinyl compound and the unsaturated acid monomer may be catalyzed with a free radical type catalyst such as benzoyl peroxide, methyl ethyl ketone peroxide, cumene hydroperoxide, etc. A reaction accelerator such as cobalt naphthenate may be used in combination with the catalyst to get a satisfactory rate of reaction at low, safe catalyst levels. In general, the resin systems may be catalyzed satisfactorily using from 0.05 to 5.0 and preferably from 0.1 to 2.0 weight percent of catalyst plus accelerator with the catalyst concentration being about five times that of the accelerator. The cross-linking reaction of the α,β-unsaturated carboxylic acid with the curing agent may be speeded by addition of an acid catalyst such as di-2-ethylhexylphosphoric acid or a basic catalyst such as tridimethyl amino methyl phenol.

The procedure for preparing the thermosettable resin is important if the resin is to have a long shelf life. A solution of the interpolymer and vinyl monomer having an almost indefinite shelf life is prepared by dissolving between 5 and 80 and preferably 25 to 50 weight percent of the interpolymer in 20 to 95, and preferably 40 to 75, weight percent of the vinyl monomer. At any time within about two days prior to use from about 2 to 20 and preferably from 3 to 6 parts by weight of the unsaturated acid monomer, based on the reactive vinyl monomer, is dissolved in the interpolymer solution. Immediately prior to use the free radical catalyst and cross-linking agent as well as the acid type cross-linking catalyst may be added. The quantity of cross-linking agent which is used is based upon the carboxyl equivalents in the resin solution. Sufficient cross-linking agent should be used to provide from 0.25 to 1.5 and preferably from 0.4 to 0.8 functional groups per carboxyl equivalent in the resin system. The amount of catalyst and accelerator added usually will be in the range between 0.05 and 5.0 weight percent, with the relative amounts of catalyst and accelerator varying with the conditions under which the resin will be cured as well as the rate of cure which is desired.

The following example illustrates the method of preparing a resin according to this invention and the properties of a laminate made with the resin.

A solution was prepared containing 62.4 weight percent styrene monomer, 2.9 percent maleic anhydride monomer and 34.7 percent of an interpolymer containing 90 percent styrene and 10 percent maleic anhydride, the molecular weight of the interpolymer being such that a 10 percent solution in methyl ethyl ketone had a viscosity of about 1.5 centipoise at 25° C. On the basis of 100 parts of this solution, 3.76 parts propylene glycol were added followed by 1.0 part benzoyl peroxide and 0.2 part cobalt naphthenate. A 12-ply glass laminate was made with this resin and style 181 Volan A finish glass cloth, using a hand lay-up technique. The laminate was allowed to set for 24 hours at room temperature then heated to 130° C. for one hour. At that time a pressure of 40 pounds per square inch was applied and the laminate held at 130° C. for an additional 24 hours. The resulting laminate was ⅛ inch thick, had a good appearance and excellent physical properties. The flexural strength was 54,000 lbs./sq.in. at room temperature and dropped only slightly to 49,000 lbs./sq.in. at 160° F.

Table I lists the properties of resins which were cross-linked with various polyfunctional compounds. The extent of cross-linking is reflected in the percent of the cured resin which was insoluble in methyl ethyl ketone and the Barcol hardness of the resin. These samples were prepared by mixing 66.6 parts by weight of styrene monomer with 3.2 parts maleic anhydride monomer and 33.3 parts of an interpolymer of styrene and maleic anhydride containing 10 percent maleic anhydride and having a viscosity of 1.5 centipoise at 25° C. when measured as a 10 weight percent solution in methyl ethyl ketone. Immediately before use the solution was catalyzed by the addition of 1.0 part benzoyl peroxide and 0.2 percent cobalt naphthenate. The polyfunctional curing agent was then added on the basis of 1.5 hydroxyl groups, one active amino hydrogen or 1.0 epoxy group per anhydride group. The samples were cured in aluminum dishes at 120°±2° C. for about 48 hours. The percent insolubles were determined by soaking the cured samples in methyl ethyl ketone for 48 hours at room temperature, then evaporating to dryness in a vacuum oven and weighing.

TABLE I.—PROPERTIES OF CURED STYRENE-MALEIC ANHYDRIDE RESINS

| Sample No. | Curing Agent | Barcol Hardness | Percent Insoluble |
|---|---|---|---|
| 1 | Propylene glycol | 23–46 | 82.3 |
| 2 | 1,5-Pentane diol | 31–34 | 96.0 |
| 3 | Polyethylene glycol (200 mol. wt.) | 23 | 86.9 |
| 4 | Hydroxypropyl glycerine (266 mol. wt.) | 15 | 80.1 |
| 5 | Trans-2,3-dibromo-2-butene-1,4-diol | | 62.2 |
| 6 | Glycerine | | 56.3 |
| 7 | Styrene-allyl alcohol copolymer (19% allyl alcohol) | 34 | 98.5 |
| 8 | Ethylene glycol diester of tetrabromophthalic anhydride | 21 | 63.0 |
| 9 | Polyether of propylene oxide and bisphenol A | | 78.2 |
| 10 | Diglycidyl ether of bisphenol A | 20 | 33.5 |
| 10–a* | Diglycidyl ether of bisphenol A | 42 | 104.6 |
| 11* | Diglycidyl ether of tetrabromobisphenol A | 32 | 105.6 |
| 12* | Epoxidized novolac | 40 | 96.6 |
| 13 | Epoxidized polybutadiene | 24 | 70.2 |
| 13–a* | Epoxidized polybutadiene | 30 | 99.0 |
| 14 | Styrene oxide | 12 | 47.6 |
| 15 | 4,4'-methylenedianiline | | 51.7 |
| 16 | Monoethanolamine | 15 | 67.9 |

*Catalyzed with 0.5 part tridimethylamino methyl phenol.

The epoxidized novolac used in Sample No. 12 was one having an epoxide equivalent weight of 175–182 and a viscosity between 30,000 and 90,000 centipoise at 125° F. Samples 13 and 13–a contained an epoxidized polybutadiene having an epoxide equivalent weight of 177 and a viscosity of 180,000 centipoise at 25° C.

The results of tests with the samples in Table I illustrate the wide range of polyfunctional compounds which may be used to cure these resins. Under the comparable conditions used in the preparation of these samples, some of the curing agents produced resins more highly cross-linked or insoluble than others. The polyepoxides did not cross-link readily at these conditions in the absence of an amine catalyst of the type commonly used as a hardener for epoxy resins, e.g. a tertiary amine.

Resins containing vinyl monomers other than styrene were prepared from a solution of the styrene-maleic anhydride interpolymer in the other vinyl monomers in a manner similar to those listed in Table I. These resins containing as a reactive solvent 66.6 parts of another vinyl monomer in place of the styrene of Table I were cured with 3.64 parts of propylene glycol. The percent of the resin which was insoluble in methyl ethyl ketone was determined in the same manner as in Table I as an indication of the extent of cross-linking. These vinyl monomers used in these samples and their properties are listed in Table II.

TABLE II.—PROPERTIES OF CURED VINYL-MALEIC ANHYDRIDE RESINS

| Sample No. | Vinyl Monomer | Barcol Hardness | Percent Insoluble |
|---|---|---|---|
| 1 | Vinyl cyanide | | 98.8 |
| 2 | Vinyl acetate | | 31.0 |
| 3 | Ethyl acrylate | | 89.7 |
| 4 | Methyl methacrylate | | 28.5 |
| 5 | p-Chlorostyrene | 15 | 75.5 |
| 6 | α-Methylstyrene | | 28.8 |
| 7 | 50% Styrene, 50% Diallyl phthalate | | 46.1 |
| 8 | 50% Styrene, 50% Hydroxy ethyl acrylate | 24 | 100.8 |
| 9 | 50% Styrene, 50% Ethylene Dimethacrylate | 43 | 98.8 |
| 10 | 50% Styrene, 50% Trimethylol propane diallylether | | 92.2 |

The results in Table II illustrate the wide range of vinyl monomers which may be used as reactive solvents for the interpolymers to produce thermosettable resins. The choice of vinyl monomer ordinarily is based on the volatility of the monomer and its ability to solubilize the interpolymer, the monomeric unsaturated acid or anhydride and the cross-linking or curing agent.

Resins containing other α,β-unsaturated acids were prepared according to the procedure used in preparing the resins of Table I except that the monomeric maleic anhydride was replaced by an equivalent amount of another unsaturated acid. As in the samples of Table II, these resins were cured with 3.64 parts of propylene glycol, the same amount as was used in Sample No. 1 of Table I. The properties of these resins are presented in Table III.

TABLE III.—PROPERTIES OF CURED STYRENE-UNSATURATED ACID RESINS

| Sample No. | Unsaturated Acid | Percent Insoluble |
|---|---|---|
| 1 | Itaconic acid | 55.6 |
| 2 | Acrylic acid | 62.0 |
| 3 | Ethyl half ester of maleic anhydride | 77.3 |
| 4 | Diethanolamine adduct of maleic anhydride | 18.1 |

The insolubility of the samples of Table III illustrates the application of this method to the cross-linking of resins containing other α,β-unsaturated acids as well as the half ester of an α,β-unsaturated dicarboxylic acid. The maleic anhydride adduct of Sample No. 4 is an unsaturated tetrahydroxy compound, with the carboxyl radicals combined with the amino groups in an amide linkage.

Resins were prepared based on interpolymers other than the styrene-maleic anhydride copolymer used in the samples reported in the foregoing tables. These resins were prepared in the same manner as Sample No. 1 of Table I by replacing the interpolymer with those having the compositions reported in Table IV. The percent insolubles were determined in the same manner as the preceding samples.

TABLE IV.—PROPERTIES OF CURED RESINS

| Sample No. | Interpolymer Composition | Percent Insoluble |
|---|---|---|
| 1 | 70.0% Styrene, 13.5% α-Methylstyrene, 16.5% Maleic anhydride. | 72.5 |
| 2 | 37.2% Methyl vinyl ether, 62.8% Maleic anhydride. | 74.2 |
| 3 | 45.0% Styrene, 20.0% Butadiene, 35.0% iso-$C_{13}$ acid maleate. | 65.8 |
| 4 | 88.8% Monochlorostyrene, 11.2% Maleic anhydride. | 65.0 |
| 5 | 88.2% Vinyl chloride, 7.3% Vinyl acetate, 8.5% Maleic anhydride.* | 22.7 |

*15 parts of this interpolymer were combined with 85 parts styrene in preparing the cross-linked resin samples.

Thus a wide variety of α,β-unsaturated carboxylic acids, anhydrides and half acid esters are operative within the scope of this invention. The principal criterion in the selection of an interpolymer and reactant monomers is that of providing a soluble system. After cross-linking, at least 10 percent of the cured resin and preferably 40 percent should be insoluble in methyl ethyl ketone.

Numerous fibers may be used with these resins in the preparation of laminates. Glass cloth and glass roving as well as chopped glass fibers are particularly useful. Other fibers and fillers include sisal, cotton, asbestos, clay, powdered silica, etc.

In addition to the use of these resin solutions in the manufacture of laminates, they may be used as a protective coating in a manner similar to the solventless varnishes.

It should be understood that mixtures of the vinyl compounds and the unsaturated acids other than those listed in Tables II, III and IV may be used in preparing these resins. Additionally the cross-linking agent may be a mixture of polyfunctional compounds.

I claim:

1. A thermosettable mixture having room temperature fluidity in the absence of non-reactive solvents consisting essentially of a resin solution containing 5–80 weight percent of an interpolymer of a vinyl compound and an α,β-unsaturated carboxylic acid wherein said interpolymer contains from 2 to 25 weight percent of said unsaturated acid, the viscosity of a ten percent solution of said interpolymer in methyl ethyl ketone at 25° C. being no greater than about 10 centipoise, said solution containing from 20 to 95 percent of a vinyl monomer, from 2 to 20 parts by weight of a monomeric α,β-unsaturated carboxylic acid per 100 parts of said solvent vinyl monomer dissolved therein, a cross-linking agent containing at least two functional groups selected from the group consisting of hydroxyl, epoxide and amine groups in an amount sufficient to provide 0.25–1.5 functional equivalents per equivalent of carboxyl functionality in said interpolymer solution, and 0.05 to 5.0 weight percent of a free radical catalyst and polymerization accelerator.

2. A thermosettable mixture according to claim 1 wherein said interpolymer is a copolymer of styrene, α-methylstyrene and maleic anhydride.

3. A thermosettable mixture according to claim 1 wherein said interpolymer is a copolymer of a vinyl compound and a cyclic anhydride of said α,β-unsaturated carboxylic acid.

4. A thermosettable mixture according to claim 1 wherein said interpolymer is a copolymer of monochlorostyrene and maleic anhydride.

5. A thermosettable mixture according to claim 1 wherein said vinyl monomer contains up to 50 weight percent of a divinyl monomer.

6. A thermosettable mixture according to claim 1 wherein said cross-linking agent is propylene glycol.

7. A thermosettable mixture according to claim 1 wherein said cross-linking agent is 2,2-bis(2,3-epoxypropoxyphenyl)propane.

8. A thermosettable mixture according to claim 1 wherein said cross-linking agent is monoethanolamine.

9. A thermosettable mixture according to claim 1 wherein said cross-linking agent is the polyhydric copolymer of styrene and allyl alcohol.

10. A thermosettable resin mixture having room temperature fluidity in the absence of a non-reactive solvent consisting essentially of a solution containing 25–50 weight percent of an interpolymer of a vinyl compound and an α,β-unsaturated carboxylic acid wherein said interpolymer contains 5–20 weight percent of said acid, said interpolymer being dissolved in a vinyl monomer, the viscosity of a ten percent solution of said interpolymer in methyl ethyl ketone at 25° C. being no greater than about ten centipoise, from 3 to 6 parts by weight of a monomeric α,β-unsaturated carboxylic acid per 100 parts of said solvent vinyl monomer dissolved therein, a cross-linking agent containing at least two functional groups selected from the group consisting of hydroxyl, epoxide and amine groups in an amount sufficient to provide from 0.4 to 0.8 functional equivalents per equivalent of carboxyl functionality in said interpolymer solution and from 0.1 to 2.0 weight percent of a free radical catalyst and polymerization accelerator.

11. A thermosettable resin mixture having room temperature fluidity in the absence of a non-reactive solvent consisting essentially of a solution containing from 25 to 50 weight percent of a copolymer of styrene and maleic anhydride, said copolymer containing from 5 to 20 weight percent of said maleic anhydride, the viscosity of a ten percent solution of said copolymer in methyl ethyl ketone at 25° C. being no greater than about ten centipoise, said copolymer being dissolved in monomeric styrene having from 3 to 6 parts by weight of monomeric maleic anhydride per 100 parts of said styrene dissolved therein, a quantity of propylene glycol sufficient to provide from 0.7 to 0.8 hydroxyl equivalents per equivalent of maleic anhydride in said copolymer and monomer, and from 0.1 to 2.0 weight percent of a mixture of benzoyl peroxide and cobalt naphthenate as a catalyst.

12. A method of producing a thermoset laminated resin in the absence of a non-reactive solvent comprising:

dissolving in a vinyl monomer from 5 to 80 parts of an interpolymer of a vinyl compound and an α,β-unsaturated carboxylic acid, said interpolymer containing from 2 to 25 weight percent of said acid, then dissolving from 2 to 20 parts of a monomeric α,β-unsaturated carboxylic acid in said interpolymer solution, thereafter mixing a cross-linking agent having at least two functional groups selected from the group consisting of hydroxyl, epoxide and amine groups with said interpolymer solution in an amount sufficient to provide from 0.25 to 1.5 functional equivalents per equivalent of carboxyl functionality in said interpolymer solution, then mixing a catalyst with said solution and impregnating a fibrous material therewith, and heating said impregnated fibrous material to effect a thermal set of said interpolymer solution.

13. A method of producing a thermoset laminated resin in the absence of a non-reactive solvent comprising:

dissolving an interpolymer of styrene and maleic anhydride in styrene monomer, said interpolymer containing from 5 to 20 weight percent of said maleic anhydride and producing a solution containing from 25 to 50 weight percent of said interpolymer in styrene monomer, the viscosity of a ten percent solution of said interpolymer in methyl ethyl ketone at 25° C. being no greater than about ten centipoise, dissolving in said interpolymer solution from 3 to 6 parts by weight of monomeric maleic anhydride per 100 parts of said styrene monomer, mixing with said solution a polyfunctional cross-linking agent selected from the group consisting of polyols, polyepoxides and polyamines, said cross-linking agent being sufficient to provide from 0.4 to 0.8 functional equivalents per equivalent of carboxyl functionality in said solution, then mixing a free radical catalyst with said solution and impregnating a fibrous material therewith, and heating said impregnated fibrous material to effect a thermal set thereof.

References Cited by the Examiner

UNITED STATES PATENTS 2,047,398   7/1936   Voss et al. _____ 260—886
3,085,986   3/1963   Muskat _____ 260—31.8

MURRAY TILLMAN, *Primary Examiner.*

J. T. GOOLKASIAN, *Assistant Examiner.*